(12) United States Patent
Najafi et al.

(10) Patent No.: US 7,957,584 B2
(45) Date of Patent: Jun. 7, 2011

(54) FAST OBJECT DETECTION FOR AUGMENTED REALITY SYSTEMS

(75) Inventors: Hesam Najafi, West Windsor, NJ (US); Yakup Genc, Dayton, NJ (US)

(73) Assignee: Siemens Corporation, Iselin, NJ (US)

( * ) Notice: Subject to any disclaimer, the term of this patent is extended or adjusted under 35 U.S.C. 154(b) by 0 days.

(21) Appl. No.: 12/717,195

(22) Filed: Mar. 4, 2010

(65) Prior Publication Data

US 2010/0158355 A1    Jun. 24, 2010

Related U.S. Application Data

(63) Continuation of application No. 11/405,838, filed on Apr. 18, 2006, now Pat. No. 7,706,603.

(60) Provisional application No. 60/672,635, filed on Apr. 19, 2005, provisional application No. 60/672,636, filed on Apr. 19, 2005.

(51) Int. Cl.
*G06K 9/00*    (2006.01)

(52) U.S. Cl. .................................................... 382/154
(58) Field of Classification Search .................. 382/154, 382/103, 286; 345/419–427
See application file for complete search history.

(56) References Cited

U.S. PATENT DOCUMENTS

| 2001/0043738 A1* | 11/2001 | Sawhney et al. ............... 382/154 |
| 2003/0012410 A1* | 1/2003 | Navab et al. .................. 382/103 |

* cited by examiner

*Primary Examiner* — Vikkram Bali
*Assistant Examiner* — Daniel Zeilberger

(57) ABSTRACT

A detection method is based on a statistical analysis of the appearance of model patches from all possible viewpoints in the scene, and incorporates 3D geometry during both matching and pose estimation processes. By analyzing the computed probability distribution of the visibility of each patch from different viewpoints, a reliability measure for each patch is estimated. That reliability measure is useful for developing industrial augmented reality applications. Using the method, the pose of complex objects can be estimated efficiently given a single test image.

18 Claims, 5 Drawing Sheets

FAST OBJECT DETECTION FOR AUGMENTED REALITY SYSTEMS

CROSS REFERENCE TO RELATED APPLICATIONS

This application is a continuation of U.S. patent application Ser. No. 11/405,838 filed on Apr. 18, 2006 and entitled, "Fast Object Detection for Augmented Reality Systems," which issued as U.S. Pat. No. 7,706,603 on Apr. 27, 2010, which claims the benefit of U.S. Provisional Application Ser. No. 60/672,635 entitled "Hierarchical Feature Descriptors for Fast Object Detection," filed on Apr. 19, 2005, and of U.S. Provisional Application Ser. No. 60/672,636 entitled "Fusion of 3D and Appearance Models for Near Real-Time Pose Estimation," filed on Apr. 19, 2005, the contents of which are hereby incorporated by reference herein in their entirety.

FIELD OF THE INVENTION

The present invention relates generally to the field of computer vision, and more particularly, to techniques and systems for pose estimation and object detection, for use in augmented reality systems.

BACKGROUND OF THE INVENTION

Solutions for feature-based 3D tracking have been proposed for augmented reality applications. The majority of those approaches run in a known environment and require fast re-initialization; i.e., providing the system with the initial pose parameters of the camera. Real-time estimation of the camera's initial pose relative to an object, however, remains an open problem. The difficulty stems from the need for fast and robust detection of known objects in the scene given their 3D models, or a set of 2D images, or both.

In computer vision applications, local image features have proven to be very successful for object detection. Those methods usually reduce the problem to a wide-baseline stereo matching problem, where local feature regions associated with key or interest points are first extracted independently in each image and then characterized by photometric descriptors for matching.

Local descriptors can be computed efficiently. A redundant combination of such descriptors provides robustness to partial occlusion and cluttered backgrounds. Ideally, the descriptors are distinctive and invariant to viewpoint and illumination variations. Many different descriptors have been proposed. The Scale Invariant Feature Transform (SIFT) descriptor introduced by Lowe has been shown to be one of the most efficient descriptors with good performance in image retrieval tasks.

In the computer vision arts, a number of feature detectors are known to be invariant to scale and affine transformations. For example, K. Mikolajczyk et al. have compared the performance of several state-of-the-art affine region detectors using a set of test images under varying imaging conditions (K. Mikolajczyk et al., A Comparison of Affine Region Detectors, IJCV (2004)). The comparison shows that there does not exist one detector that systematically outperforms the other detectors for all scene types. The detectors are rather complementary; some are more adapted to structured scenes and others to textures.

Given an arbitrary scene or target object, however, it is unclear which type of feature is more appropriate for matching, and whether performance depends on viewing direction.

The problem of 3D object detection for pose estimation has been addressed by a number of approaches. Some methods are based on statistical classification techniques, such as Principle Component Analysis (PCA), to compare the test image with a set of calibrated training images. Other techniques are based on matching of local image features. Those approaches have been shown to be more robust to viewpoint and illumination changes. They are furthermore more robust against partial occlusion and cluttered backgrounds.

While some approaches use simple 2D features such as corners or edges, more sophisticated approaches rely on local feature descriptors that are insensitive to viewpoint and illumination changes. Usually, geometric constraints are used as verification criteria for the estimated pose.

An affine-invariant image descriptor for 3D object recognition has been described (K. Mikolajczyk & C. Schmid, An Affine Invariant Interest Point Detector, 42 2002 ECCV at 128142). Photometric- and geometric-consistent matches are selected in a pose estimation procedure based on the RANSAC algorithm introduced by Fishler and Bolles in 1981. Although that method achieves good results for 3D object detection, it is too slow for real-time applications.

Other rotation invariant local descriptors have been proposed. For example, D. Lowe, Object Recognition from Local Scale Invariant Features, 1999 ICCV at 11501157, proposes a method for extracting distinctive scale and orientation invariant key points. The distinctiveness is achieved by using a high-dimensional vector representing the image gradients in the local neighborhood for each key point.

Among the prior art descriptors, the SIFT descriptor has been shown to be particularly robust. SIFT descriptors, however are high dimensional (128-dimensional) and computationally expensive to match.

E. Rothganger, S. Lazebnik, C. Schmid. & J. Ponce, 3D Object Modeling and Recognition Using Affine-Invariant Patches and Multiview Spatial Constraints, 2003 Proc. of Conference on Computer Vision and Pattern Recognition, propose a 3D object modeling and recognition approach for affine viewing conditions. The objects are assumed to have locally planar surfaces. A set of local surface patches from the target object is reconstructed using several images of the object from different viewpoints. The 3D object is then represented with the set of respective local affine-invariant descriptors and the spatial relationships between the corresponding affine regions. For matching, variants of RANSAC based pose estimation algorithms are used, minimizing the back-projection error in the test image.

That method has two drawbacks. First, it is not computationally efficient. Second, representing every surface patch with a single descriptor may yield poor matching performance where there are wide viewpoint changes in the test image.

Other approaches use dimension reduction techniques, such as PCA, in order to project high-dimensional samples onto a low-dimensional feature space. PCA has been applied to the SIFT feature descriptor. It has been shown that PCA is well-suited to representing key point patches, and that that representation is more distinctive and therefore improves the matching performance. It is furthermore more robust and more compact than the 128-dimensional SIFT descriptor.

Y. Lepetit, J. Pilet, & P. Fua, Point Matching as a Classification Problem for Fast and Robust Object Pose Estimation, 2004 Proceedings of Conference on Computer Vision and Pattern Recognition, treat wide baseline matching of key points as a classification problem, where each class corresponds to the set of all possible views of such a point. By building compact descriptors, the detection of key features can be done at run-time without loss of matching performance.

Conventional methods for object detection/recognition are based on local, viewpoint-invariant features. For example, some conventional feature detection methods rely on local features that are extracted independently from both model and test images. Another technique is descriptor computation characterization by invariant descriptors. Feature detection methods may also use 2D-2D or 2D-3D matching of the descriptors, or 2D-3D pose estimation.

Several problems exist with those conventional approaches. They are limited by the repeatability of the feature extraction and the discriminative power of the feature descriptors. Large variability in scale or viewpoint can lower the probability that a feature is re-extracted in the test image. Further, occlusion reduces the number of visible model features. Extensive clutter can cause false matches.

Each of those problems may result in only a small number of correct matches. It is typically very difficult to match correctly even with robust techniques such as RANSAC.

There is therefore presently a need to provide a method and system for fast object detection and pose estimation using 3D and appearance models. The technique should be capable of increased speed without sacrificing accuracy. To the inventors' knowledge, there is currently no such technique available.

SUMMARY OF THE INVENTION

The present invention addresses the needs described above by providing a method for real-time pose estimation of an object in a sample view, the method comprising the steps of selecting, in an off-line environment, a set of stable feature regions of the object; incorporating, in an off-line environment, multiple view descriptors of a view set for each selected feature region into a statistical model; constraining a search area of the statistical model using geometric consistencies between the statistical model and the sample view; and searching the constrained search area to match regions in the statistical model with regions in the sample view.

The step of selecting, in an off-line environment, a set of stable feature regions of the object, may further comprise the steps of: creating a set of environmental maps of the object; extracting affine covariant features from the environmental maps; and selecting a set of feature regions based on a stability of a feature across multiple environmental maps.

The step of selecting a set of feature regions based on a stability of a feature across multiple environmental maps, may further comprise comparing the feature across multiple environmental maps using a Mahalanobis distance of respective SIFT descriptors. In that case, the method may further comprise the step of removing repetitive feature regions by clustering feature regions based on similarity.

The step of incorporating, in an off-line environment, multiple view descriptors of a view set for each selected feature region into a statistical model, may further comprise the steps of: determining SIFT descriptors of the selected feature regions; reducing a dimensionality of gradient image vectors of those descriptors using PCA-SIFT; minimizing the impact of illumination by normalizing the vectors; and ensuring a Gaussian distribution of the gradient image vectors by applying a Chi-square test.

The step of constraining a search area of the statistical model using geometric consistencies between the statistical model and the sample view, may further comprise matching the stable feature regions with classes of regions visible from viewpoints. The matching may be an iterative process wherein a next candidate region is chosen based on visibility from a viewpoint. An Nth candidate match $f'_k \leftrightarrow C'_k$, $1 < k \leq N$ may be selected in a deterministic manner:

$$(f'_k, C'_k) = \mathrm{argmax}_{f_k \in F \setminus \{f_1, \ldots, f_{k-1}\}} P(C_k | f_k)$$

$$C_k \in \bigcap_{l=1}^{k-1} V'_{c_l}$$

wherein f is a 2D feature, C is a class representing a view set, and $V_{C_l}$ is a set of all classes from where $C_l$ is visible.

The step of searching the constrained search area to match regions in the statistical model with regions in the sample view, may further comprise the steps of: extracting feature regions from the sample view; projecting multiple view descriptors of a view set for each feature region extracted from the sample view into a feature space; and processing each view descriptor using a Bayesian classifier to determine whether it belongs to a view set class of the statistical model.

In that case, the step of processing each view descriptor using a Bayesian classifier, may further comprise the steps of selecting a match by determining an a posteriori probability whether a test feature $f_j$ belongs to a view set class $C_i$ $$P(C_i | f_j) = \frac{P(f_j | C_i) P(C_i)}{\sum_{k=1}^{N} p(f_j | C_k) P(C_k)},$$

and processing each view descriptor using a Bayesian classifier to determine whether it belongs to the view set class of the statistical model. The step of processing each view descriptor using a Bayesian classifier may include using a threshold probability to accelerate runtime matching.

Another embodiment of the invention is a computer program product comprising a computer readable recording medium having recorded thereon a computer program comprising code means for, when executed on a computer, instructing said computer to control steps in the method described above.

DESCRIPTION OF THE INVENTION

The inventors have discovered an improved method of object detection. In the method, a statistical analysis is performed of the appearance of key points from all possible viewpoints in the scene. The method then makes use of the known 3D geometry in both the matching and pose estimation processes.

Figure 1:
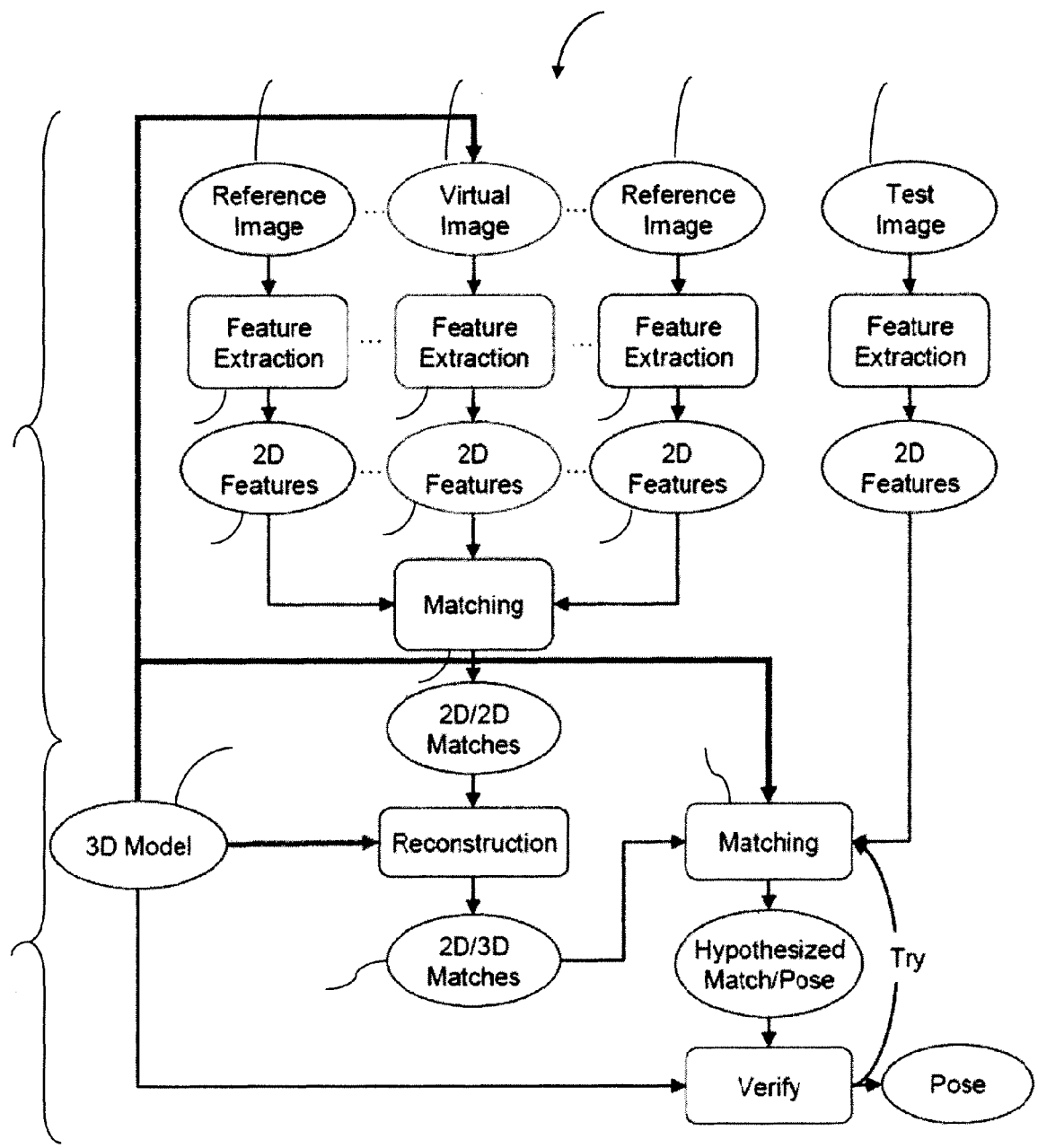
FIG. 1 is a flow diagram of a system and method of the invention.

FIG. 1 depicts an overview 100 of the system and method of the invention for object detection according to the invention, as well as elements from conventional methods for comparison. Most of the conventional methods make use of techniques for wide-baseline stereo matching, which is solely based on 2D images without considering any run-time requirements. In many applications both a 3D model 110 and several training images 115, 125 may be available or can be created easily during an off-line process.

The approach of the present invention includes two phases. In a training phase 101, a compact appearance and geometric representation of the target object is built. This is as an off-line process. The second phase 102 is an on-line process where a test image is processed for detecting the target object using the representation built in the training phase.

The training phase requires input comprising of a set of images 115, 125 and a 3D model 110 of the target object. If the model is not available, the calibrated views can be used to build a 3D model using off-the-shelf modeling tools. For a sufficient statistical representation, the training data 115, 125 can be augmented with synthesized images 120 for all those viewpoints where no real images are available.

During training, the variations in the descriptors of each feature (features 118, 123, 128) are learned using principal component analysis (PCA) (steps 117, 122, 127). Furthermore, for each feature, a reliability measure is estimated by analyzing the computed probability distribution of its visibility from different viewpoints (step 130). The problem of finding matches (step 150) between sets of features in the test image 140 and on the object model 135 is formulated as a classification problem. This is constrained by using the reliability measure of each feature. That representation is more scalable in the sense that it reduces the effect of model complexity on the run-time matching performance.

As an application, the presently described method is intended to be used to provide robust initialization for a frame-rate feature-based pose estimator where robustness and time efficiency is very critical.

Given a 3D model of the target object and a set of calibrated training images, the goal of the present invention is to identify the pose of the object in a given test image. The object detection approach is based on two stages: a learning stage 101 (FIG. 1) which is done offline, and the matching stage 102 at run-time. The entire learning and matching processes are fully automated and unsupervised.

Figure 4:
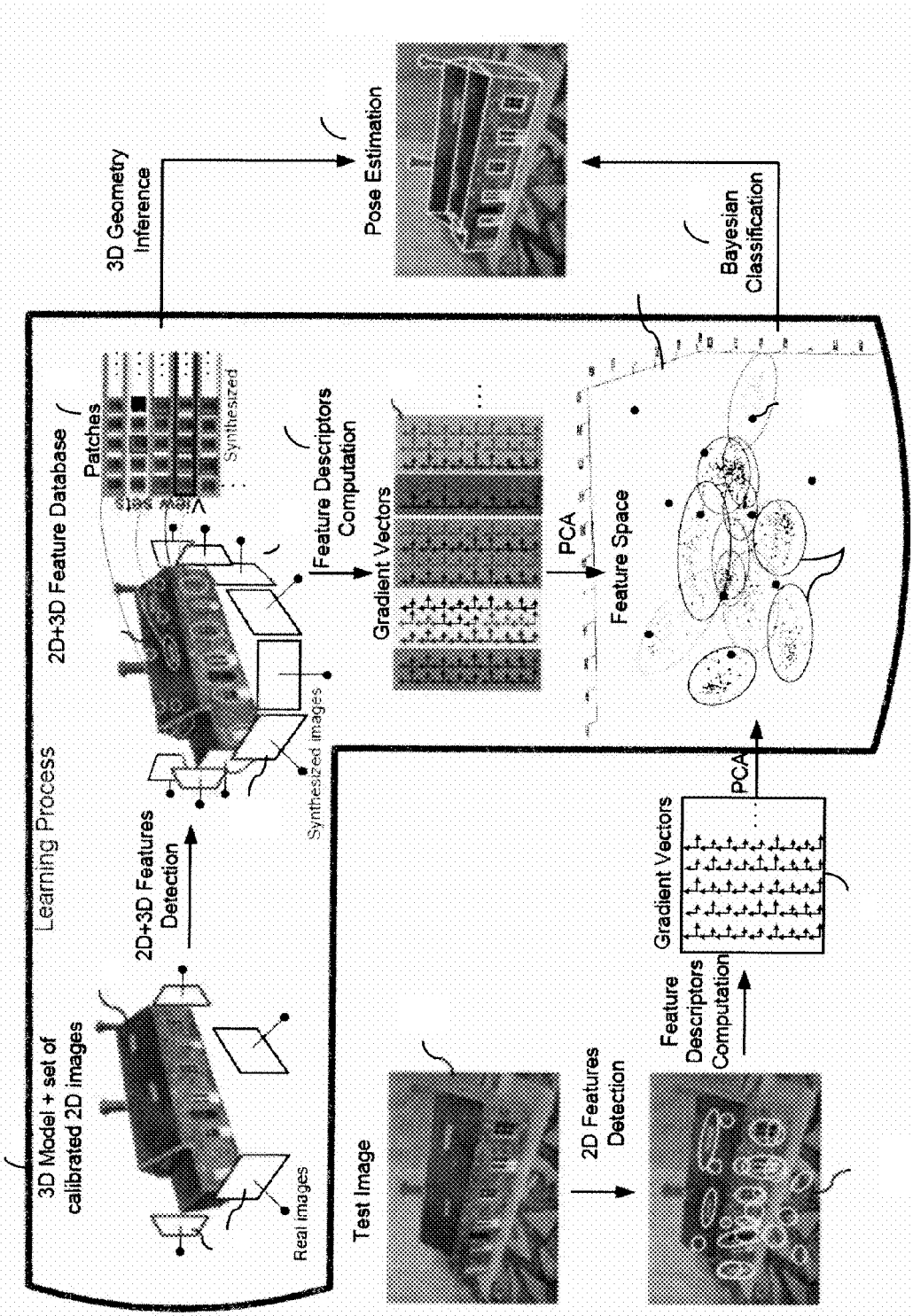
FIG. 4 is a schematic diagram of a system of the invention.

The following is a more detailed description of the learning stage, as well as the matching and pose estimation algorithms of the matching stage that enforce both photometric and geometric consistency constraints. That detailed description is made with reference to FIG. 4, which is a schematic overview of the object detection process 400 for real-time pose estimation.

Creating Similarity Maps and View Sets

In the first step of the learning stage 410, a set of stable feature regions are selected from the object by analyzing their detection repeatability and accuracy as well as their visibility from different viewpoints.

Figure 2:
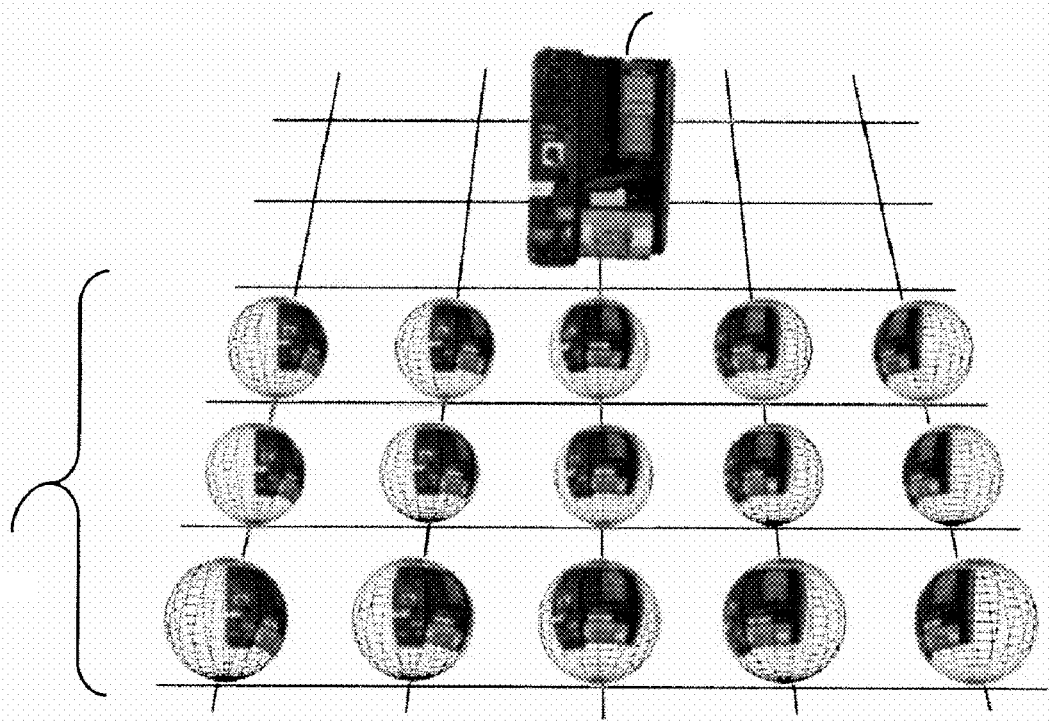
FIG. 2 is schematic illustration of a subset of environmental maps surrounding an object.

Images such as the real images 412 of the object 415 represent a subset of the sampling of the "plenoptic function." The plenoptic function is a parameterized function for describing everything that can be seen from all possible viewpoints in the scene. In computer graphics terminology, the plenoptic function describes the set of all possible environment maps for a given scene. In the present case, a complete sample of the plenoptic function is defined as a full spherical environment map. Individual environmental map views, such as the subset of views 210 (FIG. 2), vary with position on the sphere surrounding the object of interest 220.

Having a set of calibrated images 412 (FIG. 4) and the virtual model of the target object 415, the viewing space is coarsely sampled at discrete viewpoints and a set of environment maps 420 is created. Because not all samplings can be covered by the limited number of training images, synthesized views 416 are created from other viewpoints using computer graphics rendering techniques. Due to the complexity of the target object and the sample rate, that can be a time-consuming procedure. The process of synthesizing views, however, does not affect the computational cost of the system at run-time because it can be done off-line.

Next, affine covariant features are extracted 422 from the environment maps 420. As described below, several different feature detectors were examined by the inventors for use in the object detection and pose estimation method. The inventors found that the Hessian-Affine and Harris-Affine feature detectors provide more corresponding regions than other detectors. Since the same feature detector will be applied to the test image for matching at run-time, the speed of the detector should be as great as possible.

"Good" feature regions are then selected. Such feature regions are characterized by their detection repeatability and accuracy. The basic measure of accuracy and repeatability is the relative amount of overlap between the detected regions in the environment maps and the respective reference regions projected onto that environment map using the ground truth transformation. For example, the reference regions may be determined from the parallel views to the corresponding feature region on the object model (model region). That overlap error is defined as the error in the image area covered by the respective regions. A feature is selected as a "good" feature if, for different views covering at least a minimum part of the space, the respective overlap errors are sufficiently small.

Figure 3:
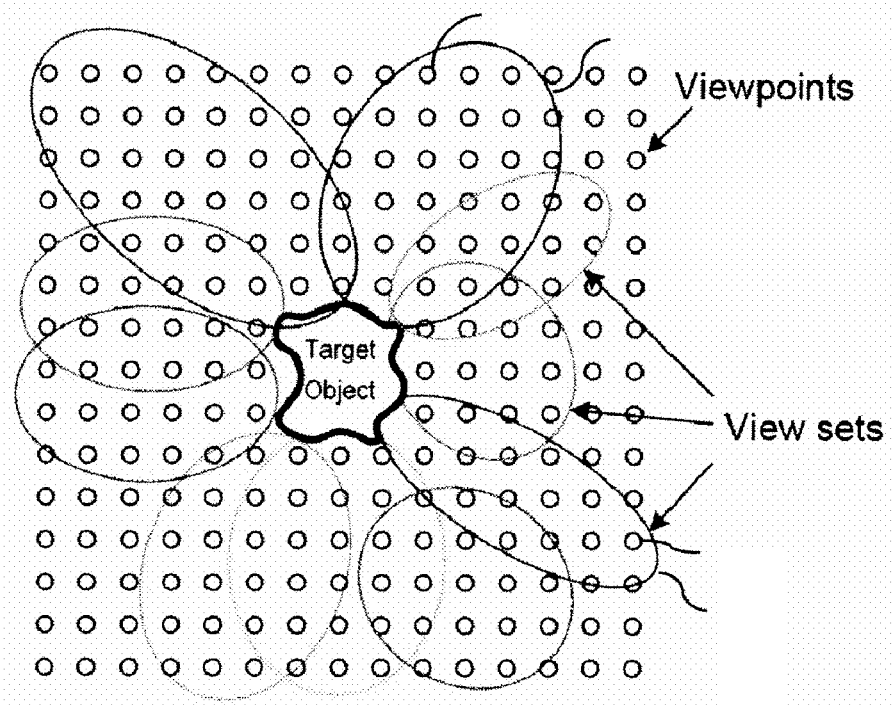
FIG. 3 is a 2D illustration of 3D clusters of view sets surrounding an object.

As shown in FIG. 3, a view set such as view sets 310, 320, is, for each model region of the target object 305, the set of its appearances in the environment maps from all possible viewpoints such as viewpoints 311, 321. Depending on the 3D structure of the target object 305, a model region may be clearly visible only from certain viewpoints in the scene. For example, a target region may not be visible from a given viewpoint because of occlusion, self-occlusion or scale changes when a region gets too small when a viewpoint is far away.

The extracted regions are compared based on a similarity measure, and for each model feature a similarity map is created. For each model region the respective similarity map represents the probability distribution of its visibility. As a similarity measure, the inventors have used the Mahalanobis distance of the respective SIFT descriptors. That analysis can also be used to remove the repetitive features visible from the same viewpoints in order to keep the more distinctive features for matching. Based on the similarity maps of each model region, groups of viewpoints are clustered together using the mean-shift algorithm. For each model region $m_j$ the set of 3D coordinates of the clustered viewpoints is computed:

$$W(m_j) = \{v_{j,k} \in \mathcal{R}^3 | 0 < k < N_j\}.$$

Learning the Statistical Representation

Multiple view descriptors of each view set are now incorporated into a statistical model. For that purpose, the PCA-SIFT descriptor is used for a more compact representation. Thereby, the gradient image vectors $g_{i,j}$ (element 425 of FIG. 4) are computed and both vertical and horizontal gradient maps of the respective region are combined to a vector. For resized regions (e.g., of sizes 32×32) that results in large gradient vectors (e.g., 2592 elements). PCA is used to reduce the dimensionality of the gradient vectors so that the main structural information of the regions is represented in the first few components 433 (e.g., first 32 components) in the feature space 430.

In order to minimize the impact of variations of illumination, especially between the real and synthesized images, the descriptor vectors are normalized to unit magnitude. PCA is used to project image gradient vectors $g_{i,j}$ into the feature space to a compact feature vector $e_{i,j}$.

It is assumed that the distribution of the gradient vectors is Gaussian for the carefully selected features as described in the previous section. For each region k samples are taken from the respective environment maps so that the distribution of their feature vectors $e_{i,j}$ for $0<j\leq K$ in the feature space is Gaussian. To ensure the Gaussian distribution of the gradient vectors for each view set, a $\chi^2$ test is applied for a maximal number of samples. If the $\chi^2$ test fails after a certain number of samplings for a region, the region will be considered as not reliable enough and will be excluded. For each input view set $V_i$, the covariance matrix $\Sigma_i$ and the mean $\mu_i$ of the distribution are determined.

Under a separate heading below, a technique is provided for arranging the feature descriptors in a hierarchical manner for improved speed performance in object detection.

Matching as a Classification Problem

Matching is the task of finding groups of corresponding pairs between the regions extracted from the model and test image, that are consistent with both appearance and geometric constraints. The matching problem can be formulated as a classification problem. The goal is to construct a classifier 460 (FIG. 4) so that the misclassification rate is low.

In a given test image 450, the features 451 are extracted as in the learning stage 410 and their gradient image vectors 455 are computed. The descriptors are then projected into feature space 430 using PCA. Those descriptors are represented by the bold dots 456 on the feature space 430.

The Bayesian classifier 460 is then used to decide whether a test descriptor belongs to a view set class or not. Let $C=\{C_1, \ldots, C_N\}$ be the set of all classes representing the view sets and let F denote the set of 2D features $F=\{f_1, \ldots, f_K\}$ extracted from the test image.

Using the Bayesian rule, the a posteriori probability $P(C_i|f_j)$ that a test feature $f_j$ belongs to the class $C_i$:

$$P(C_i \mid f_j) = \frac{P(f_j \mid C_i)P(C_i)}{\sum_{k=1}^{N} p(f_j \mid C_k)P(C_k)}$$

For each test descriptor the a posteriori probability of all classes is computed and candidate matches are selected using thresholding. Let $m(f_j)$ be the respective set of most probable potential matches $m(f_j)=\{C_i|P(C_i|f_j)\geq T\}$. The purpose of that threshold is simply to accelerate the runtime matching and not to consider matching candidates with low probability. The threshold is not crucial for the results of pose estimation.

Pose Estimation Using Geometric Inference

This section describes a method using geometric consistency to further constrain the search space for finding candidate matches.

Various methods have been used for matching with geometric constraints. For example, interpretation trees or alignment techniques, geometric hashing and robust statistical techniques such as RANSAC have all been used with varying degrees of success for matching using geometric consistency. Rothganger et al. obtained good results using different variants of RANSAC where the re-projection error is minimized. Belief propagation criteria such as neighborhood consistency can also be used as geometric constraints.

Those methods, however, do not take advantage of the prior knowledge in the available 3D model. The inventors have further exploited the 3D geometry of the target object in order to achieve lower computational costs for object detection at run-time.

As a first step, the method creates environment maps 470 and looks at each individual region from all possible different viewpoints in the space. For each viewpoint the distribution of the visibility of all regions can be determined in an off-line stage.

For the pose estimation 480 a set of $N\geq 3$ matches is required. In an iterative manner, the first match $f'_1 \leftrightarrow C'_1$ is chosen as the pair of correspondences with the highest confidence:

$$\operatorname{argmax}_{f_k \in F} P(C_l \mid f_k).$$
$$C_l \in C$$

$V_{C_l}$ is defined as the set of all classes of regions that should also be visible from the viewpoints where $C_l$ is visible $$V_{C_l} = \{C_k \in C \mid |W_k \cap W_l| \neq 0\}$$

where $W_j$ is the set of 3D coordinates of the clustered viewpoints $\{v_{j,k}|0<k\leq N_j\}$ for which the respective model region is visible.

Assuming the first candidate match is correct, the second match $f'_2 \leftrightarrow C'_2$ is chosen only from the respective set of visible regions $$\operatorname{argmax}_{f_k \in F\setminus\{f'_1\}} P(C_l \mid f_k).$$
$$C_l \in V_{C'_1}$$

After each match selection the search area is therefore constrained to visibility of those regions based on previous patches. In general the $N^{th}$ candidate match $f'_k \leftrightarrow C'_k$, $1<k\leq N$ is selected in a deterministic manner $$(f'_k, C'_k) = \operatorname{argmax}_{f_k \in F\setminus\{f'_1, \ldots, f'_{k-1}\}} P(C_k \mid f_k)$$
$$C_k \in \bigcap_{l=1}^{k-1} V_{C'_l}$$

The termination criterion is defined based on the back-projected overlap error in the test image. That algorithm may be implemented in different ways. For example, the algorithm may be a recursive implementation with an interpretation tree where the nodes are visited in a depth-first manner. The depth is the number of required matches N for the pose estimation method. As the experimental results below show, that algorithm has a lower complexity than the "plain" or "exhaustive" version of RANSAC where all pairs of candidate matches are examined.

Experimental Results

The method of the invention has been tested in a series of experiments using virtual and real objects. The following subset of results using real objects is presented to give the reader of greater understanding of the invention.

For an off-line learning process to create a 3D model, the accuracy requirements depend on the underlying pose estimation algorithms, the object size and the imaging device. In the presently described experiments, the inventors used ImageModeler from RealVizoff. The experimental setup comprised a target object and a commonly available FireWire camera (Fire-I). The camera was internally calibrated and lens distortions were corrected using the Tsai's algorithm.

A set of experiments were conducted to analyze the functional and timing performance of the approach. The results were compared to a conventional approach that was based solely on 2D key frames. The inventive method required, as input, a set of images (or key frames) of the target object. The key frames were calibrated using a calibration object (a known set of markers) for automatically calibrating the views. Those markers were used to compute the ground truth for evaluating the matching results on test frames as well.

In a first experiment, functional performance was analyzed against view point variations for the same scene but under uncontrolled lighting. The images were taken by a camera moving around the object. Results of several metrics used to compare the techniques are shown in the plot 500 of FIG. 5.

One measure of performance is the final size of the representation (number of features in the database) used for both methods, indicated by the two straight lines 510, 511. With increasing number of key frames, the size of the database in the conventional case 510 increases linearly with the number of key frames. In contrast, the method of the present invention keeps fewer features in the 2D-3D database after careful implicit analysis of their planarity, visibility and detection repeatability. The database size 511 in the method of the invention is proportional to the scene complexity, not the number of available key frames. That is an important property for the scalability of the system for more complex objects.

Figure 5:
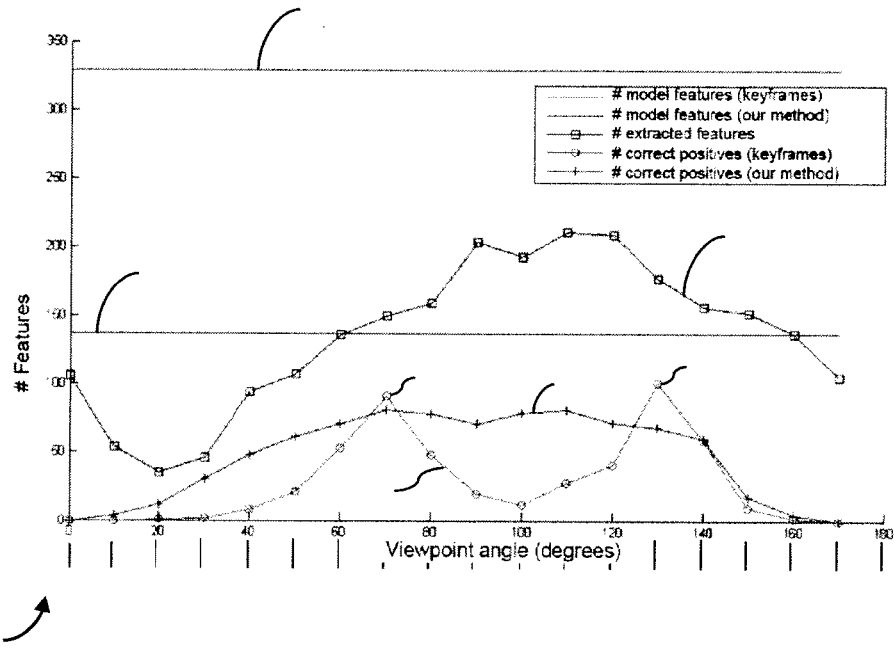
FIG. 5 is a plot of several parameters versus viewpoint angle, comparing the method of the invention with conventional techniques.

Also shown in FIG. 5 are the number of extracted features 515 and the number of correct matches found by the conventional method 520, and the method of the invention 521, for each of the 19 test images. It should be noted that, near the two key frames 525, 526, the method of the invention obtains fewer correct matches than the conventional method. That is due to the fact that the representation of the present invention generalizes the extracted features, whereas the conventional methods keep them as they are. The generalization has the cost of missing some of the features in the images closer to the key frames. On the other hand, the generalization helps to correctly match more features in disparate test views.

Figure 6:
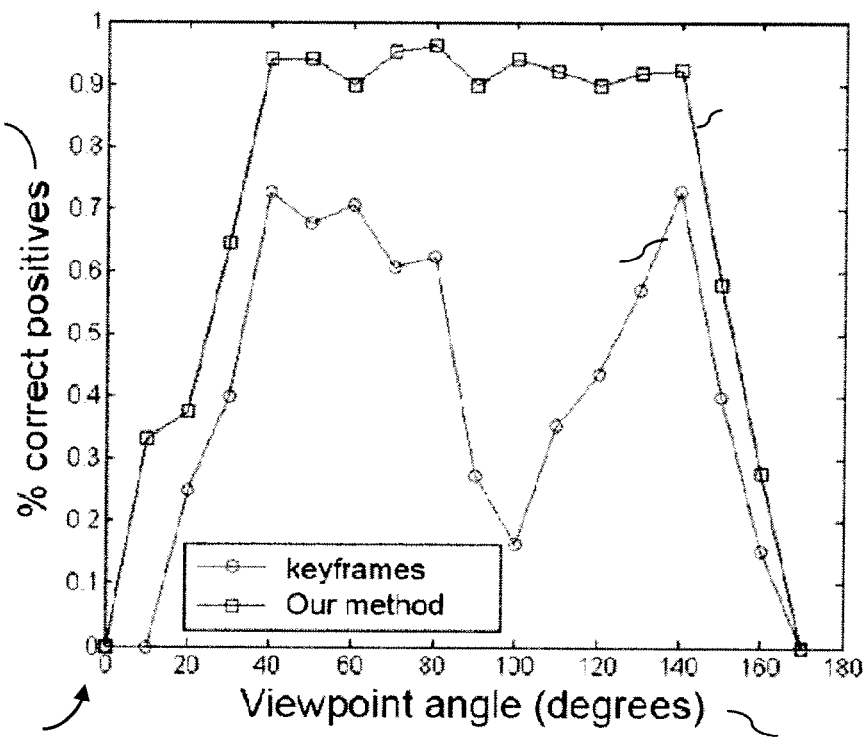
FIG. 6 is a plot of percent correct positives versus viewpoint angle, comparing the method of the invention with conventional techniques.

Complexity and performance of robust pose estimation methods like RANSAC are dependent, not on the number of correct matches, but the ratio between correct and false matches. The graph 600 of FIG. 6 shows the percentage of correct matches 610 versus the viewing angle 620 for the method of the invention 630 and the conventional approach 640. Although the method of the invention obtains fewer matches near the key frames, it has a higher percentage of correct positives. As a result of that and the visibility constraints used, the inventive method needs only a few RANSAC iterations for pose estimation.

Figure 7:
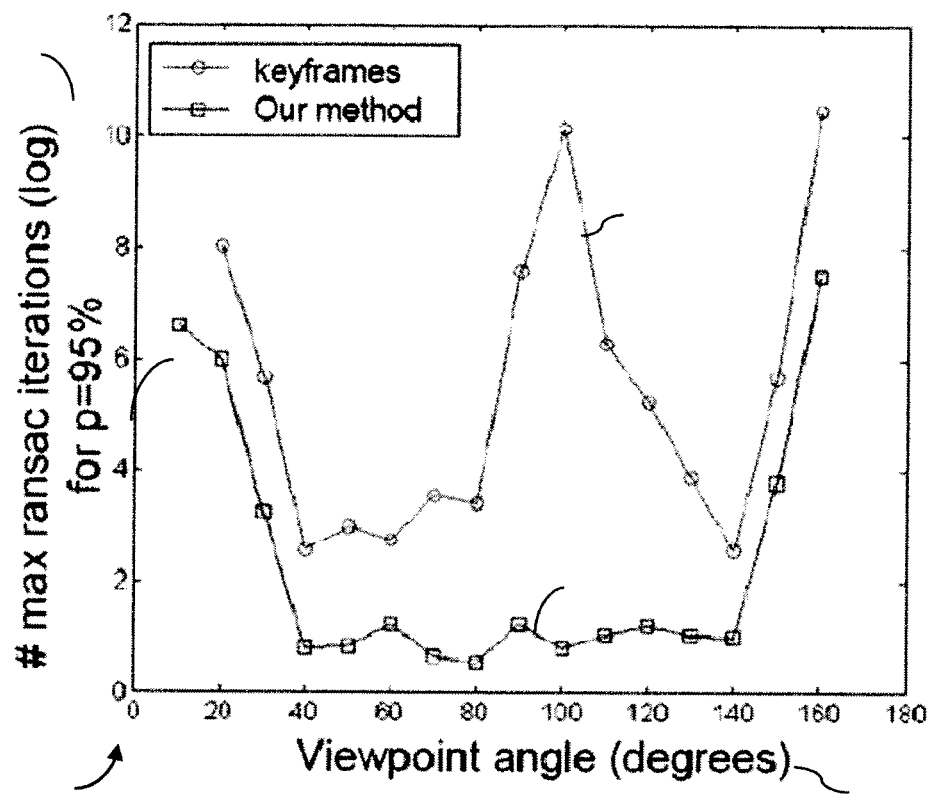
FIG. 7 is a plot of a number of RANSAC iterations versus viewpoint angle, comparing the method of the invention with conventional techniques.

As to timing performance of the matching methods, the method of the present invention uses a more complex matching method than the conventional method. Therefore, each individual match costs more. However, with increasing complexity of the target object with respect to self-occlusions, the method of the present invention becomes more efficient. The graph 700 of FIG. 7 shows the respective maximum number of iterations needed 710 (logarithmic scale) for RANSAC-based pose estimation with a confidence probability of 95%, as a function of viewpoint angle 720, for the method of the invention 730 and a conventional method 740. The method of the present invention obtains up to a five-fold speed increase compared to the exhaustive RANSAC method. The non-optimized implementation 730 of the inventive method shown requires about 0.3 to 0.6 seconds compared to 2.5 seconds for the conventional approach 740.

Figure 8:
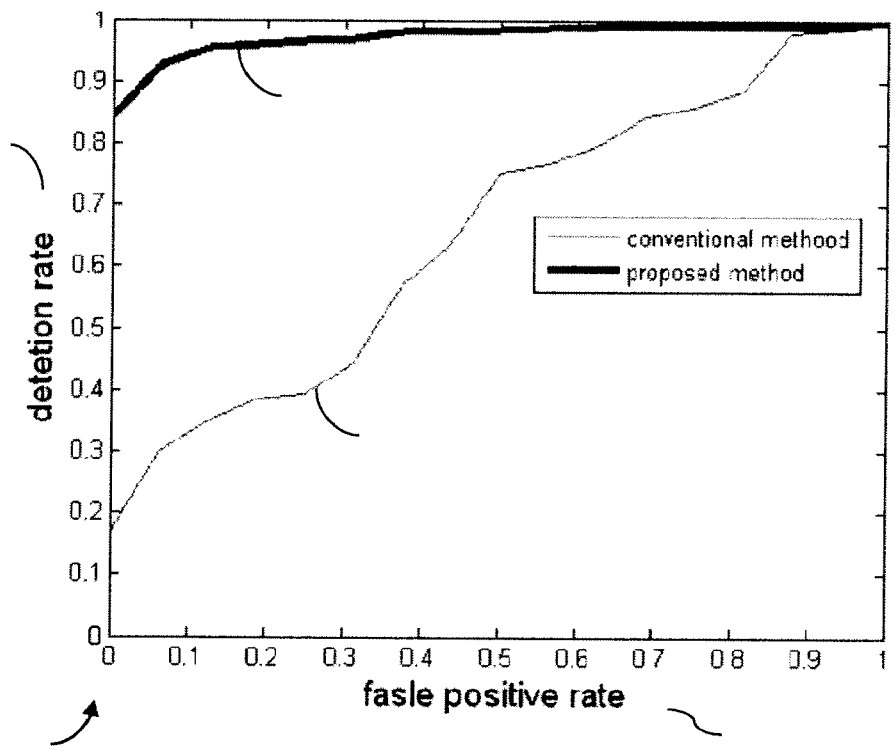
FIG. 8 is a plot of a number of detection rate versus false positive rate, comparing the method of the invention with conventional techniques.

The performance of the matching potion of the system of the present invention was evaluated by processing all pairs of object model and test images, and counting the number of established matches. The plot 800 of FIG. 8 shows the ROC curve that depicts the detection rate 810 versus false-positive rate 820, while varying the detection threshold T. Compared to the conventional keyframe-based approach 9840, the approach 830 used by the inventors performs very well and achieves 97% detection with 5% false-positives.

Hierarchical Feature Detection Descriptors for Fast Object Detection

Using the following technique, the speed performance of the object detection function is greatly improved by arranging the feature detection descriptors in a hierarchical manner. As in the method described above, this method begins with a 3D model of the object, together with a set of real-life images of the object. The images must be calibrated; i.e., the correspondences between pixels in the image and the 3D points on the object is known.

In the method, an initial small set of features is extracted at a fixed scale. The first feature is selected and the scale where the filter response (Laplacian) reaches a maximum is found.

For each test region, a Mahalanobis distance of the invariant descriptors to all model regions is computed. Each region is then matched to the model regions for which the Mahalanobis distance between the corresponding descriptors is minimal and below a threshold. The needed covariance matrix may be estimated by tracking the regions over a set of images taken during the learning phase (see below).

As a final check, regions from the n closest regions are chosen based on an appearance similarity measure. In one example of such a similarity measure, a linear combination is used of grey-level normalized cross correlation (NCC) and the average Euclidean distance in RGB space, after geometric and photometric normalization. In another example, a 10×10 color histogram is drawn from the UV position of YUV space. A measure of the contrast in the region (average gradient norm) is used to determine a tight or relaxed threshold on color.

For a first set of tentative matches the three most similar regions above a threshold are chosen. Every region has none, one, two or three matches to model regions. The number of correct matches is maximized at the cost of producing many mismatches.

During the learning phase the repeatability and accuracy of each feature is measured with the detector used. Specifically, it is determined to what extent the detected region overlaps exactly the same scene area under changing viewpoint and lighting conditions or shadows.

For each model region, a set of so called "support features/regions" is created for unique characterization in the 3D model feature database. An error estimation and propagation of the affinities and the respective support regions is performed.

Different types of hierarchical descriptors may be used for support features or regions. The following are several examples: homogeneous regions selected by their SIFT descriptors; different scaled versions of the model regions; nearby features like edges, lines, colors; topological arrangements of features, barycentric neighborhood constraints, belief propagation techniques; sideness constraint wherein the center of a region should be on the same side of the directed line going from the center of a second region to the center of a third region (that constraint holds for coplanar triples); the ratio of regions or region intersections as an invariant of the affine transformation; and the ratio of lengths of line segments along rays emanating from the region's center.

A statistical analysis of the detected features during the learning stage is then conducted as an offline process. That analysis includes detector evaluation (repeatability measure, overlap error), descriptor evaluation (covariance estimation) based on the calibrated images, and evaluation of the support features/regions (descriptors). The evaluation includes, during learning for different errors for different sets of support regions and descriptors are generated for each specific model region. At runtime based on the uncertainty of the estimated affinity the set of support regions and descriptors is selected. The support regions (descriptors) are ranked depending on their uncertainty (covariance matrix), complexity (computational time) and likelihood of detection and information content.

The method iteratively constructs for each region new correspondences from the support features in a first expansion phase and tries to remove mismatches in a second contraction phase. In the expansion phase, the support regions are propagated; i.e., new matches are constructed based on geometric transformation of the respective nearby model regions.

The number of correct matches grows after each iteration. Once enough reliable feature matches are found, pose estimation is applied and the results verified. The less strong constraints like the sideness constraint can tolerate non-rigid deformations.

Based on the statistical analysis of the features done during the learning phase, it can be decided when to apply refinement; i.e. local searching for the best matching response of the respective descriptors. A hierarchical process is performed to match the most reliable features before the more complex ones where refinement is needed eventually.

The uncertainty of the detected region computed from the training images is a lower bound. The propagated error to the neighboring support regions becomes larger with the distance. At runtime, given the test image based on the propagated uncertainty of the region, the right support region can be used for verification. For example, if the uncertainty of the detected region in the test image is bigger than the uncertainty of the second support region and smaller than the third support region, it is better to rely on the first and second regions since the error in the third region would be too high.

CONCLUSION

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the method is disclosed herein using PCA image comparison and SIFT descriptors, the method may utilize any similarly-performing algorithms, now available or developed in the future, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for real-time pose estimation of an object in a sample view, the method comprising the steps of:
   in an off line computer:
      using a 3D computer model of the object and a plurality of calibrated real images containing views of the object, rendering a plurality of calibrated synthesized images containing views of the object;
      extracting a plurality of feature regions from the real and synthesized images;
      identifying model regions of the 3D computer model represented by the extracted feature regions, by establishing a correspondence between the 3D computer model and the calibrated real and synthesized images;
      for each identified model region of the 3D computer model, building a view set of viewpoints from which the model region is extractable; and
      filtering and ranking the model regions based at least in part on the view sets of the model regions to create a hierarchical list of model regions;
   receiving a sample view of the object;
   extracting a set of sample feature regions from the sample view; and
   matching sample feature regions with model regions of the object using the hierarchical list of model regions, without reference to predetermined initial pose parameters, comprising:
      identifying an initial match of a sample feature region with a model region using a classifier to compare the sample feature regions with the hierarchical list of model regions;
      constraining a search area to model regions extractable from at least one viewpoint of the view set of viewpoints from which the initial match model region is extractable; and
      searching the constrained search area to match additional sample feature regions with model regions of the object.

2. The method of claim 1, wherein search area is further constrained after each match.

3. The method of claim 1, wherein the step of extracting a plurality of feature regions from the real and synthesized images further comprises:
   extracting affine covariant features.

4. The method of claim 1, wherein the step of extracting a set of sample feature regions from the sample view further comprises:
   extracting affine covariant features.

5. The method of claim 1, wherein the step of filtering and ranking the model regions based at least in part on the view sets of the model regions to create a hierarchical of model regions, further comprises the step of:
   ranking the model regions based on a number of viewpoints from which each model region is extractable.

6. The method of claim 1, wherein the step of filtering and ranking the model regions based at least in part on the view sets of the model regions to create a hierarchical list of model regions, further comprises the step of:
  removing repetitive feature regions by clustering model regions based on similarity.

7. The method of claim 1, wherein the synthesized images supplement a coarse sampling of real images.

8. The method of claim 1, wherein the receiving, extracting and matching steps are performed in real time.

9. The method of claim 1, wherein the step of matching sample feature regions with model regions of the object using the hierarchical list of model regions is an iterative process wherein a next candidate region is chosen based on extractability from a viewpoint.

10. A computer program product comprising a non-transitory computer readable recording medium having recorded thereon a computer program comprising code means for, when executed on a computer, instructing said computer to control steps in a method for real-time pose estimation of an object in a sample view, the method comprising the steps of:
  using a 3D computer model of the object and a plurality of calibrated real images containing views of the object, rendering a plurality of calibrated synthesized images containing views of the object;
  extracting a plurality of feature regions from the real and synthesized images;
  identifying model regions of the 3D computer model represented by the extracted feature regions, by establishing a correspondence between the 3D computer model and the calibrated real and synthesized images;
  for each identified model region of the 3D computer model, building a view set of viewpoints from which the model region is extractable; and
  filtering and ranking the model regions based at least in part on the view sets of the model regions to create a hierarchical list of model regions;
  receiving a sample view of the object;
  extracting a set of sample feature regions from the sample view; and
  matching sample feature regions with model regions of the object using the hierarchical list of model regions, without reference to predetermined initial pose parameters, comprising:
    identifying an initial match of a sample feature region with a model region using a classifier to compare the sample feature regions with the hierarchical list of model regions;
    constraining a search area to model regions extractable from at least one viewpoint of the view set of viewpoints from which the initial match model region is extractable; and
    searching the constrained search area to match additional sample feature regions with model regions of the object.

11. The computer program product of claim 10, wherein search area is further constrained after each match.

12. The computer program product of claim 10, wherein the step of extracting a plurality of feature regions from the real and synthesized images further comprises:
  extracting affine covariant features.

13. The computer program product of claim 10, wherein the step of extracting a set of sample feature regions from the sample view further comprises:
  extracting affine covariant features.

14. The computer program product of claim 10, wherein the step of filtering and ranking the model regions based at least in part on the view sets of the model regions to create a hierarchical list of model regions, further comprises the step of:
  ranking the model regions based on a number of viewpoints from which each model region is extractable.

15. The computer program product of claim 10, wherein the step of filtering and ranking the model regions based at least in part on the view sets of the model regions to create a hierarchical list of model regions, further comprises the step of:
  removing repetitive feature regions by clustering model regions based on similarity.

16. The computer program product of claim 10, wherein the synthesized images supplement a coarse sampling of real images.

17. The computer program product of claim 10, wherein the receiving, extracting and matching steps are performed in real time.

18. The computer program product of claim 10, wherein the step of matching sample feature regions with model regions of the object using the hierarchical list of model regions is an iterative process wherein a next candidate region is chosen based on extractability from a viewpoint.

* * * * *